US012555719B2

(12) United States Patent
Miyamoto

(10) Patent No.: US 12,555,719 B2
(45) **Date of Patent: *Feb. 17, 2026**

(54) INDUCTOR COMPONENT

(71) Applicant: Murata Manufacturing Co., Ltd., Kyoto-fu (JP)

(72) Inventor: Masashi Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 111 days.

This patent is subject to a terminal disclaimer.

(21) Appl. No.: 18/473,145

(22) Filed: Sep. 22, 2023

(65) Prior Publication Data

US 2024/0013972 A1 Jan. 11, 2024

Related U.S. Application Data

(60) Continuation of application No. 16/817,526, filed on Mar. 12, 2020, now Pat. No. 11,783,995, which is a (Continued)

(30) Foreign Application Priority Data

Nov. 18, 2016 (JP) ................................ 2016-224609

(51) Int. Cl.
*H01F 27/28* (2006.01)
*H01F 17/04* (2006.01)

(Continued)

(52) U.S. Cl.
CPC ........... *H01F 27/34* (2013.01); *H01F 17/045* (2013.01); *H01F 27/006* (2013.01); *H01F 27/24* (2013.01);

(Continued)

(58) Field of Classification Search
CPC ...... H01F 27/34; H01F 17/045; H01F 27/006; H01F 27/24; H01F 27/2823; H01F 27/2828; H01F 27/29; H01F 27/38; H01F 27/306

See application file for complete search history.

(56) References Cited

U.S. PATENT DOCUMENTS 4,779,068 A 10/1988 Sakamoto et al.
6,069,549 A 5/2000 Heritier-Best (Continued)

FOREIGN PATENT DOCUMENTS

CN 103165261 A 6/2013
CN 103887040 A 6/2014

(Continued)

OTHER PUBLICATIONS

An Office Action; "Notification of Reasons for Refusal," Mailed by the Japanese Patent Office on Feb. 19, 2019, which corresponds to Japanese Patent Application No. 2016-224609 and is related to U.S. Appl. No. 15/790,116 ; with English language translation.

(Continued)

*Primary Examiner* — Mang Tin Bik Lian

(74) *Attorney, Agent, or Firm* — Studebaker Brackett PLLC

(57) ABSTRACT

When a winding density represents the number of turns of a wire per unit length in a longitudinal direction of a core portion, a plurality of inductor regions having mutually different winding densities of the wire are arrayed in the longitudinal direction of the core portion, and a low-density inductor region with the winding density being relatively low is located between first and second high-density inductor regions with the winding densities being relatively high.

17 Claims, 7 Drawing Sheets

Related U.S. Application Data division of application No. 15/790,116, filed on Oct. 23, 2017, now Pat. No. 11,024,456.

(51) Int. Cl.

| | |
|---|---|
| ***H01F 27/00*** | (2006.01) |
| ***H01F 27/24*** | (2006.01) |
| ***H01F 27/29*** | (2006.01) |
| ***H01F 27/34*** | (2006.01) |
| *H01F 27/38* | (2006.01) |

(52) U.S. Cl.

CPC ..... *H01F 27/2823* (2013.01); *H01F 27/2828* (2013.01); *H01F 27/29* (2013.01); *H01F 27/38* (2013.01)

(56) References Cited

U.S. PATENT DOCUMENTS

| | | | | |
|---|---|---|---|---|
| 6,154,112 | A | 11/2000 | Aoba et al. | |
| 6,348,850 | B1 * | 2/2002 | Kimura | H01F 17/045 336/200 |
| 2003/0030526 | A1 | 2/2003 | Hirai et al. | |
| 2004/0212476 | A1 | 10/2004 | Hsueh et al. | |
| 2007/0063804 | A1 | 3/2007 | Watanabe | |
| 2008/0224813 | A1 | 9/2008 | Hirai et al. | |
| 2010/0214050 | A1 * | 8/2010 | Opina, Jr. | H01F 27/292 29/606 |
| 2013/0154788 | A1 | 6/2013 | Morimoto et al. | |
| 2014/0167903 | A1 * | 6/2014 | Tomonari | H01F 17/045 336/220 |
| 2014/0292465 | A1 | 10/2014 | Takagi et al. | |
| 2015/0028985 | A1 * | 1/2015 | Inubushi | H01F 17/04 264/319 |
| 2016/0118184 | A1 * | 4/2016 | Ukai | H01F 17/045 336/192 |
| 2017/0053726 | A1 | 2/2017 | Takagi | |
| 2017/0200548 | A1 | 7/2017 | Takagi et al. | |
| 2017/0263372 | A1 * | 9/2017 | Ashizawa | H01F 17/045 |
| 2017/0294264 | A1 * | 10/2017 | Hashimoto | H01F 17/045 |

FOREIGN PATENT DOCUMENTS

| | | | |
|---|---|---|---|
| JP | S62-58608 | A | 3/1987 |
| JP | H07-272937 | A | 10/1995 |
| JP | H11-111526 | A | 4/1999 |
| JP | 2003-124031 | A | 4/2003 |
| JP | 2004-363178 | A | 12/2004 |
| JP | 2010-232988 | A | 10/2010 |
| JP | 2014-199904 | A | 10/2014 |
| JP | 2017-163026 | A | 9/2017 |

OTHER PUBLICATIONS

An Office Action mailed by the Chinese Patent Office on Jun. 21, 2019, which corresponds to Chinese Patent Application No. 201710927404.9 and is related to U.S. Appl. No. 15/790,116 with English language translation.

An Office Action; “Notification of Reasons for Refusal,” Mailed by the Japanese Patent Office on Jul. 2, 2019, which corresponds to Japanese Patent Application No. 2016-224609 and is related to U.S. Appl. No. 15/790,116; with English language translation.

* cited by examiner

INDUCTOR COMPONENT

CROSS-REFERENCE TO RELATED APPLICATIONS

This application is a Continuation of U.S. patent application Ser. No. 16/817,526 filed Mar. 12, 2020, which is a Divisional of U.S. patent application Ser. No. 15/790,116 filed Oct. 23, 2017, which claims benefit of priority to Japanese Patent Application 2016-224609 filed Nov. 18, 2016, the entire content of which is incorporated herein by reference.

TECHNICAL FIELD

The present disclosure relates to inductor components, and more particularly relates to a wire-wound inductor component having a structure in which a wire is wound around a core portion of a core.

BACKGROUND

For example, a wire-wound inductor component has a structure in which a wire is wound around a core portion of a core made of a magnetic material as described in Japanese Unexamined Patent Application Publication No. 2004-363178. Also, the inductor component described in Japanese Unexamined Patent Application Publication No. 2004-363178 basically has an inductor for a core portion.

An equivalent circuit of the wire-wound inductor component is illustrated in FIG. 5. As illustrated in FIG. 5, the equivalent circuit of the inductor component has an inductance L originally provided as a basic element and a capacitance C which is derived from a distribution capacitance (stray capacitance) etc. generated between the wound wires, and which is added in parallel to the inductance L. The equivalent circuit of the inductor component actually includes a series/parallel resistance; however, the resistance is not illustrated in FIG. 5 for easier understanding of the description.

Such an inductor component having a large inductance L value typically has a large equivalent parallel capacitance C value which is the above-described distribution capacitance. That is, the situation where the inductance L value is large represents that the extension length of the wire is large, and also represents that the parallel length of the capacitor electrode is long for the equivalent parallel capacitance C value. The counter area of the capacitor electrode is large. Consequently, the equivalent parallel capacitance C value becomes large. Hence, in the inductor component having the large inductance L value, the low-frequency impedance becomes high and the high-frequency impedance becomes low. In other words, an inductor component having good characteristics with low frequency has bad characteristics with high frequency.

If good characteristics are required over a wide band, there may be a method of preparing an inductor component having a large L value and an inductor component having a low L value, connecting these inductor components in series, and hence entirely expanding the band.

For example, Japanese Unexamined Patent Application Publication No. 2010-232988 describes a wide-band bias circuit having one end connected to a power supply, and the other end connected to an amplifier circuit that amplifies wide-band high-frequency signals using a predetermined frequency band. The wide-band bias circuit supplies bias current of direct current. The wide-band bias circuit includes at least three stages of inductors connected in series with respect to at least one of a node on the input side and a node on the output side of the amplifier circuit. Paragraphs 0005 and 0008 in Japanese Unexamined Patent Application Publication No. 2004-363178 describe that the multi-stage inductors of the at least three stages can comply with wide-band signals. Also, paragraphs 0034 and 0044 in Japanese Unexamined Patent Application Publication No. 2004-363178 describe that the L value of a first stage inductor being the closest to the node on the high-frequency line side is at a minimum among the at least three stages of inductors, and the L values of the second and later inductors on the low-frequency line (or direct current line) side, i.e., on the power supply side are equivalent to each other or sequentially increased.

FIG. 6 is a plan view schematically illustrating a state in which three chip inductors 1 to 3 as inductor components are connected in series via lands 4 and 5, and are mounted on a branch portion between a high-frequency line 6 and a low-frequency line 7 according to the technology described in Japanese Unexamined Patent Application Publication No. 2004-363178.

For example, high-frequency signals with several gigahertz or higher flow through the high-frequency line 6. On the other hand, low-frequency (or direct) current such as power supply current flows through the low-frequency line 7. The chip inductors 1 to 3 act to inhibit the high-frequency signals from entering the low-frequency line 7 and to inhibit the low-frequency (or direct) current from entering the high-frequency line 6.

If the chip inductor 3 among the three chip inductors 1 to 3 has the smallest L value, the chip inductors 1 and 2 have larger L values, and the L value of the chip inductor 2 is smaller than the L value of the chip inductor 1, the chip inductor 3 having the smallest L value is the closest to the high-frequency line 6, and the chip inductor 2 and the chip inductor 1 are connected in series in that order. Since the high-frequency signals flow through the high-frequency line 6, if an inductor not complying with high frequency, that is, the chip inductor 1 having a large L value approaches the high-frequency signals, this may result in an unintentional result, such as degradation in isolation. Thus, the aforementioned structure has been considered as being reasonable.

SUMMARY

FIG. 7 illustrates impedance-frequency characteristics of the above-described chip inductors 1 to 3. The L value of the chip inductor 1 was 47 μH, the L value of the chip inductor 2 was 10 μH, and the L value of the chip inductor 3 was 3.5 μH, the L values used for the characteristics measurement illustrated in FIG. 7. In FIG. 7, A indicates the impedance-frequency characteristics of the one chip inductor 1, B indicates the impedance-frequency characteristics of the one chip inductor 2, C indicates the impedance-frequency characteristics of the one chip inductor 3, and D indicates the impedance-frequency characteristics when the chip inductors 1 to 3 are connected in series.

As described above, even if the chip inductors 1 to 3 were connected in series to obtain good characteristics over the wire band, it was found that a drop of impedance is generated between resonance frequencies as indicated by D in FIG. 7.

As described above, it is difficult to obtain good characteristics over a wide band as illustrated in FIG. 7 with the configuration of related art as illustrated in FIG. 6.

Accordingly, it is an object of the present disclosure to provide an inductor component with a new configuration that can ensure high impedance over a wide band.

It is another object of the present disclosure to provide an inductor component in which a plurality of inductors connected in series are unified into one chip.

According to one embodiment of the present disclosure, an inductor component including a core includes a core portion extending in a longitudinal direction; at least one wire helically wound around the core portion; and a pair of terminal electrodes electrically connected to respective end portions of the wire.

In the above-described inductor component, when a winding density represents the number of turns of the wire per unit length in the longitudinal direction of the core portion, a plurality of inductor regions having mutually different winding densities of the wire are arrayed in the longitudinal direction of the core portion, and a low-density inductor region with the winding density being relatively low is located between first and second high-density inductor regions with the winding densities being relatively high.

With the inductor component according to the embodiment of the disclosure, a plurality of inductors are formed for a single core. That is, a plurality of inductors are unified into one chip.

In some embodiments of the disclosure, a length of the first high-density inductor region in the longitudinal direction of the core portion may differ from or may be the same as a length of the second high-density inductor region in the longitudinal direction of the core portion.

Also, in some embodiments of the disclosure, the winding density in the first high-density inductor region may differ from or may be the same as the winding density in the second high-density inductor region.

In some embodiments of the disclosure, the low-density inductor region located between the first and second high-density inductor regions may be located at a center portion in the longitudinal direction of the core portion. With this configuration, the low-density inductor region can be reasonably located between the first and second high-density inductor regions, and the directivity of the inductor component unified into one chip can be almost eliminated.

In some embodiments of the disclosure, the wire may be wound in a single layer in the low-density inductor region, and may be wound in multiple layers in the high-density inductor regions. With this configuration, the winding density of the wire can be easily changed by selection between single-layer winding and multilayer winding. Also, even if the wire is wound so that the wire in one turn contacts the wire in another turn adjacent to the one turn, the winding density of the wire can be changed by selection between single-layer winding and multilayer winding. Accordingly, the position of the wire is unlikely shifted on the core portion, and a variation in inductance value because the winding density of the wire is unpreparedly changed can be reduced. Also, the degree of magnetic coupling between the low-density inductor region and each of the first and second high-density inductor regions can be increased.

In some embodiments of the disclosure, the wire may include a single wire connected between the pair of terminal electrodes, the single wire may be wound in the single layer in the low-density inductor region, and the single wire may be wound in the multiple layers in the high-density inductor regions. Alternatively, the wire may include a plurality of wires connected between the pair of terminal electrodes, the plurality of wires may be wound in the single layer in the low-density inductor region while sequentially arrayed, and the plurality of wires may be wound in the multiple layers in the high-density inductor regions.

As described above, if the plurality of wires are connected between the pair of terminal electrodes, the (direct-current) electrical resistance value of the inductor component can be decreased.

In some embodiments of the disclosure, the core may be a drum-shaped core made of a magnetic material, and include a pair of flange portions provided at respective end portions of the core portion. Also, the inductor component may further include a plate-shaped core made of a magnetic material and bridging the pair of flange portions. With this configuration, the inductance value of the inductor component can be increased.

With the present disclosure, the inductor component has a new configuration in which the plurality of inductors are unified into one chip, and high impedance can be ensured over the wide band can be provided as clarified from the description of the embodiments (described later).

Other features, elements, characteristics and advantages of the present disclosure will become more apparent from the following detailed description of the present disclosure with reference to the attached drawings.

DETAILED DESCRIPTION

Figure 1:
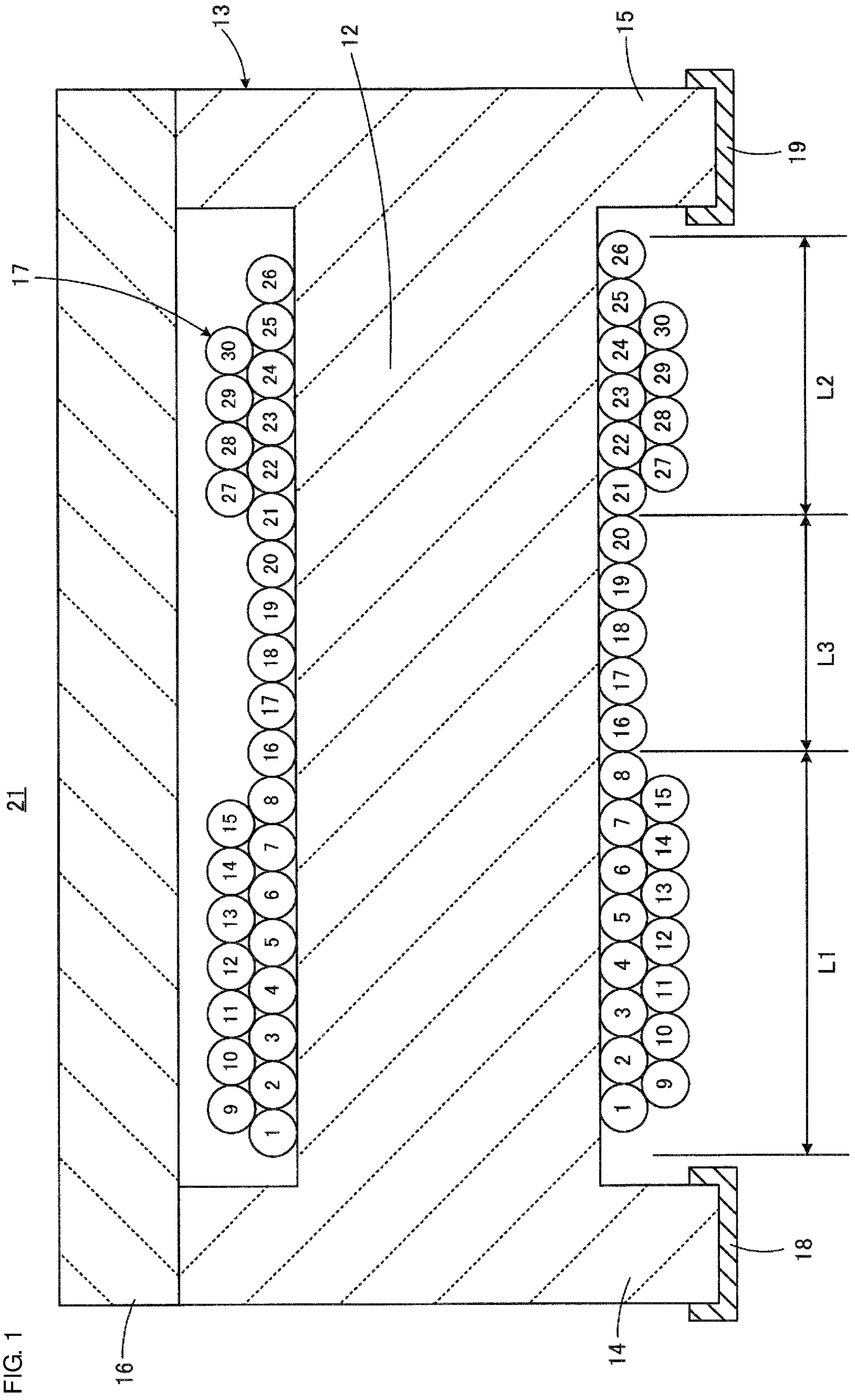
FIG. 1 is a cross-sectional view schematically illustrating an inductor component according to a first embodiment of the disclosure.

FIG. 1 is a cross-sectional view schematically illustrating an inductor component 21 according to a first embodiment of the disclosure.

As illustrated in FIG. 1, the inductor component 21 includes a drum-shaped core 13 having a core portion 12 extending in the longitudinal direction. The drum-shaped core 13 includes a pair of flange portions 14 and 15 provided at respective end portions of the core portion 12. The inductor component 11 includes a plate-shaped core 16 bridging the pair of flange portions 14 and 15. The drum-shaped core 13 and the plate-shaped core 16 are made of a magnetic material such as ferrite, and form a closed magnetic circuit.

A wire 17 is helically wound around the core portion 12. The wound form of the wire 17 will be described later in detail. The first and second flange portions 14 and 15 are respectively provided with first and second terminal electrodes 18 and 19. Although not illustrated in FIG. 1, respective end portions of the wire 17 are electrically connected to the first and second terminal electrodes 18 and 19.

In FIG. 1, the ordinal numbers of turns "1" to "30" counted from the first flange portion 14 side are written in the cross sections of the wire 17. The ordinal numbers of turns written in the cross sections of the wire 17 are also employed in FIGS. 2 and 4 (described later).

The wound form of the wire 17 on the core portion 12 is as follows. When a winding density represents the number of turns of the wire 17 per unit length in the longitudinal direction of the core portion 12, three inductor regions L1 to L3 with mutually different winding densities of the wire 17 are arrayed in the longitudinal direction of the core portion 12. To be more specific, a first high-density inductor region L1 and a second high-density inductor region L2, in which the winding densities thereof are relatively high because the wire 17 is wound in multiple layers such as two layers, are located at left and right ends in FIG. 1 of the core portion 12, and a low-density inductor region L3, in which the winding density thereof is relatively low because the wire 17 is wound in a single layer, is located at a center portion in FIG. 1.

In other words, the low-density inductor region L3 is located between the first and second high-density inductor regions L1 and L2 according to this embodiment.

As described above, since the low-density inductor region L3 located between the first and second high-density inductor regions L1 and L2 is located at the center portion in the longitudinal direction of the core portion 12, the low-density inductor region L3 can be reasonably located between the first and second high-density inductor regions L1 and L2, and in addition, the directivity of the inductor component 11 unified into one chip can be almost eliminated.

In this embodiment, the length of the first high-density inductor region L1 in the core portion 12 differs from the length of the second high-density inductor region L2 in the core portion 12; however, these lengths may be equivalent to each other depending on the requested characteristics, by adjusting the number of turns of the wire 17 in the first and second high-density inductor regions L1 and L2. In contrast, if these lengths are changed, the L value of the first high-density inductor region L1 and the L value of the second high-density inductor region L2 are changed. Hence, the peaks of impedance curves can be distributed, and the impedance can be expectedly ensured in a further wide band.

In the inductor component 21 according to this embodiment, as described above, the wire 17 is wound in the multiple layers such as the two layers in the first and second high-density inductor regions L1 and L2, and the wire 17 is wound in the single layer in the low-density inductor region L3. In this case, in the first high-density inductor region L1, the wire 17 is wound by 15 turns by the length for 8 turns, and hence the winding density is 15/8=1.875. In the second high-density inductor region L2, the wire 17 is wound by 10 turns by the length for 6 turns, and hence the winding density is 10/6=1.7. The winding density in the first high-density inductor region L1 may be the same as or may differ from the winding density in the second high-density inductor region L2. The difference between the winding density in the first high-density inductor region L1 and the winding density in the second high-density inductor region L2 may be adjusted depending on the requested characteristics. The method of differentiating the winding density in the first high-density inductor region L1 from the winding density in the second high-density inductor region L2 may be, for example, a method of omitting some of the turns in the outer layer of the two layers from one of the first and second high-density inductor regions L1 and L2.

As described above, as far as the winding density of the wire 17 is changed by selection between single-layer winding and multilayer winding, even if the wire 17 is wound so that the wire 17 in one turn contacts the wire 17 in another turn adjacent to the one turn, the winding density can be changed. Accordingly, the position of the wire 17 is unlikely shifted on the core portion 12, and a variation in inductance value because the winding density of the wire 17 is unpreparedly changed can be reduced. Also, the degree of magnetic coupling between the low-density inductor region L3 and each of the first and second high-density inductor regions L1 and L2 can be increased.

Regarding the number of turns of the wire 17 in the three inductor regions L1 to L3, the number of turns in the first high-density inductor region L1 is 15 turns, the number of turns in the second high-density inductor region L2 is 10 turns, and the number of turns in the low-density inductor region L3 is 5 turns. Hence, regarding the L values in the three inductor regions L1 to L3, the L value in the first high-density inductor region L1 is the largest, the L value in the second high-density inductor region L2 is the second largest, and the L value in the low-density inductor region L3 located between the first and second high-density inductor regions L1 and L2 is the smallest.

Figure 6:
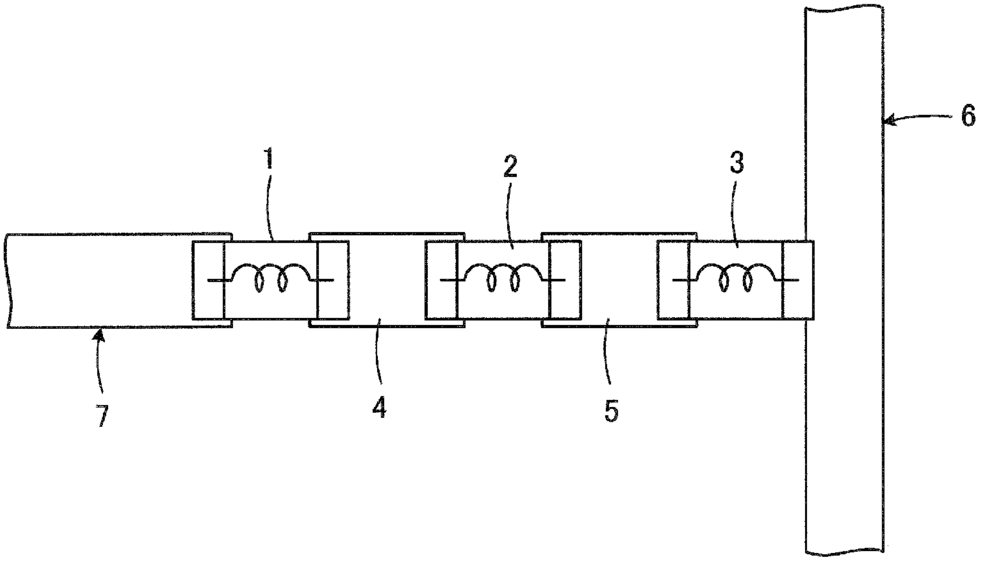
FIG. 6 is a plan view schematically illustrating a state in which three chip inductors as inductor components are connected in series via lands, and are mounted on a branch portion between a high-frequency line and a low-frequency line.
Figure 7:
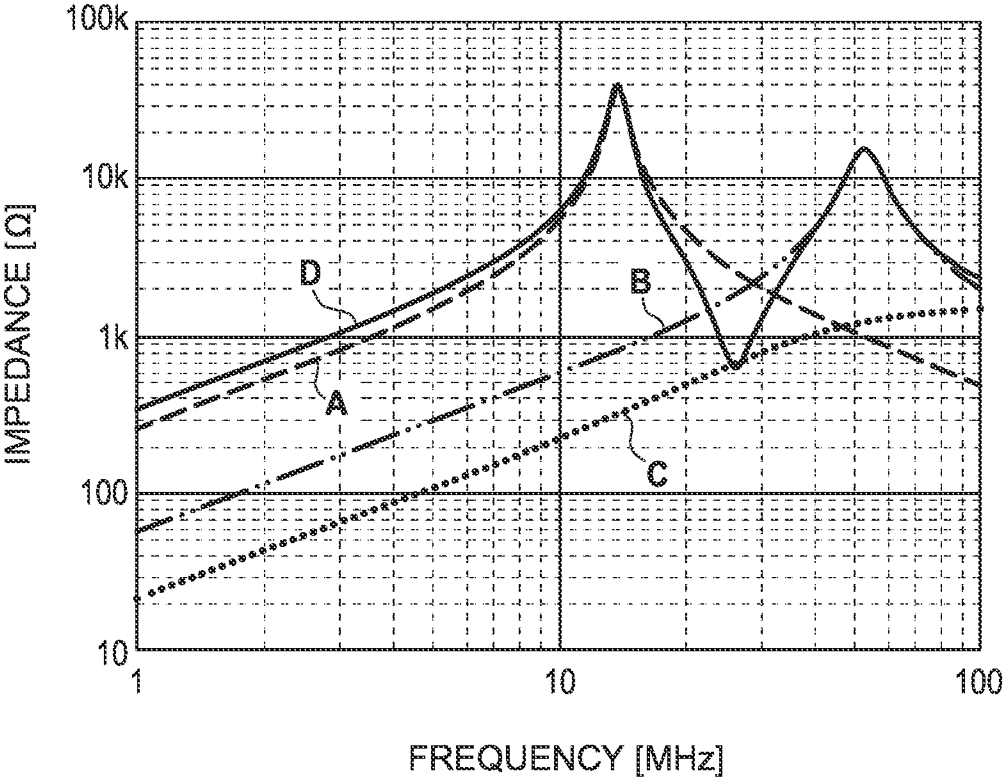
FIG. 7 illustrates impedance-frequency characteristics of the chip inductors illustrated in FIG. 6, and impedance-frequency characteristics when the chip inductors are connected in series.

Regarding the magnitude relationship among the L values as described above, the arrangement order of the three inductor regions L1 to L3 differs from the arrangement order of the three chip inductors 1 to 3 illustrated in FIG. 6. An advantage of making the L value the smallest in the low-density inductor region L3 located between the first and second high-density inductor regions L1 and L2 like this embodiment is considered below.

The magnetic material forming the drum-shaped core 13 and the plate-shaped core 16, for example, ferrite has very high magnetic permeability μ with megahertz-band frequencies, and hence causes adjacent inductors to be strongly coupled with each other. In particular, in a case of a closed magnetic circuit configuration to which the plate-shaped core 16 is attached, the coupling coefficient in a low-frequency range is almost 1 (complete coupling) at any position in the closed magnetic circuit. However, in a range with higher frequencies of several hundreds of megahertz, the magnetic permeability μ decreases, and the coupling coefficient decreases even if the closed magnetic circuit configuration is employed. In such a frequency range, the magnetic coupling is stronger as the distance between inductors is smaller.

When the low-density inductor region L3 with the smallest L value is located between the first and second high-density inductor regions L1 and L2 with the larger L values in the longitudinal direction of the single core portion 12 like this embodiment, the low-density inductor region L3 at the center is weakly magnetically coupled to the high-density inductor regions L1 and L2 on both sides in the high-frequency region, and hence the inductance value increases.

On the other hand, the high-density inductor regions L1 and L2 arranged on both sides are weakly coupled to the low-density inductor region L3 at the center. However, since the L value in the low-density inductor region L3 at the center is small, the increase in L value is very small. Regarding the relationship between the first high-density inductor region L1 and the second high-density inductor region L2 respectively arranged at one end and the other end with the low-density inductor region L3 interposed therebetween, the first and second inductor regions L1 and L2 are apart, hence are almost not affected by each other, and are not substantially coupled to each other.

That is, only the low-density inductor region L3 for high-frequency characteristics arranged at the center is affected by the high-density inductor regions L1 and L2 adjacent thereto, and the L value thereof substantially increases.

Figure 2:
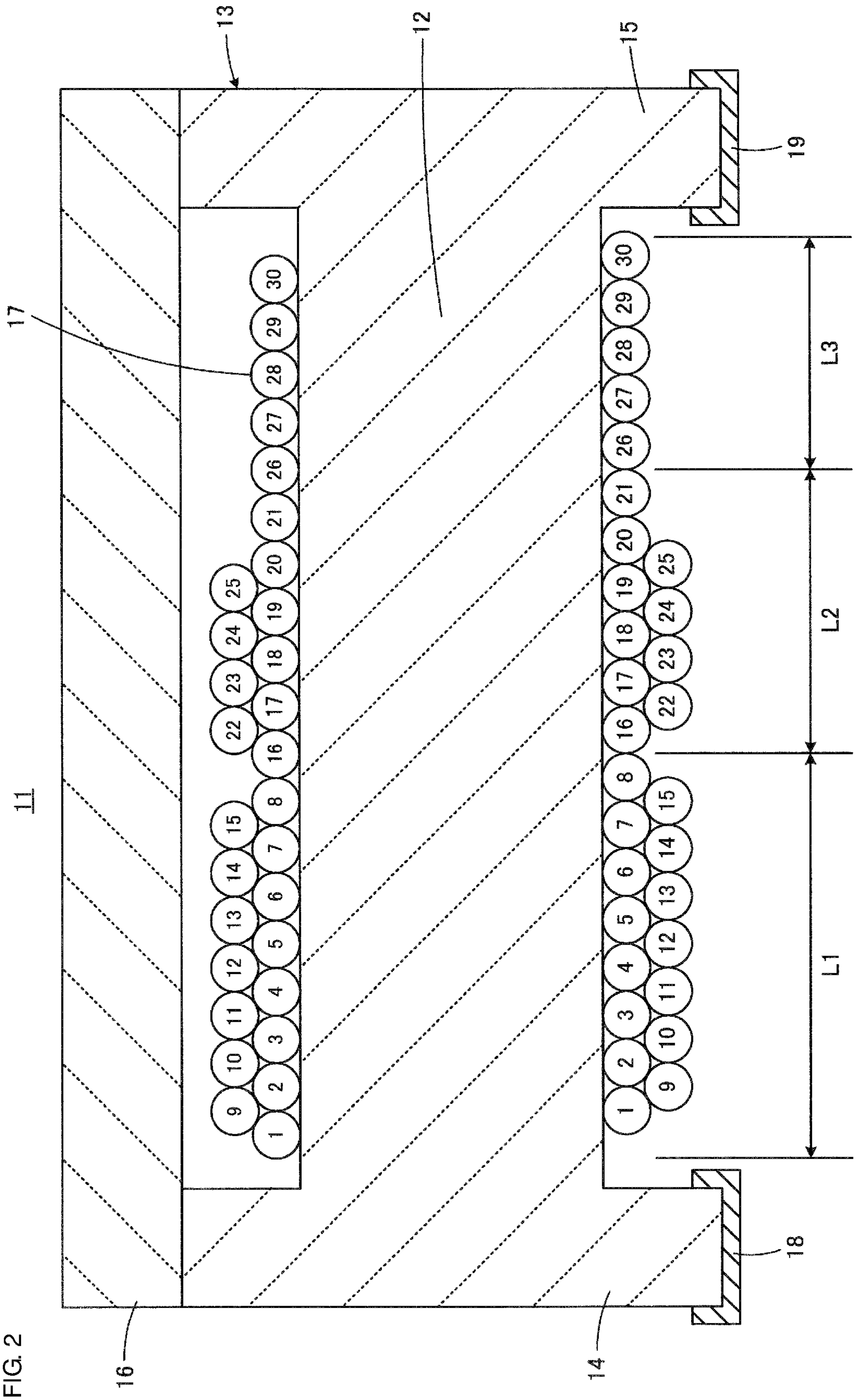
FIG. 2 is a cross-sectional view schematically illustrating an inductor component being a comparative example for the inductor component illustrated in FIG. 1.

In contrast, FIG. 2 is a cross-sectional view schematically illustrating an inductor component 11 as a comparative example that employs the array order of the three chip inductors 1 to 3 connected in series as illustrated in FIG. 6. In FIG. 2, like reference signs are applied to like components corresponding to those illustrated in FIG. 1, and redundant description is omitted.

The inductor component 11 illustrated in FIG. 2 has three inductor regions L1 to L3 in which the wire 17 is arrayed in the longitudinal direction of a core portion 12 and which mutually have different winding densities, similarly to the case of the inductor component 21 illustrated in FIG. 1. However, the array order of the three inductor regions L1 to L3 in the inductor component 11 illustrated in FIG. 2 differs from the case of the inductor component 21 illustrated in FIG. 1. That is, in the inductor component 11 illustrated in FIG. 2, the array order of the three inductor regions L1 to L3 is determined such that the first high-density inductor region L1 and the second high-density inductor region L2 with relatively high winding densities are located at the left end and the center portion in FIG. 2 of the core portion 12, and the low-density inductor region L3 with a relatively low winding density because of single-layer winding is located at the right end in FIG. 2 of the core portion 12.

Regarding the number of turns of the wire 17 in each of the three inductor regions L1 to L3, the number of turns in the first high-density inductor region L1 is 15 turns, the number of turns in the second high-density inductor region L2 is 10 turns, and the number of turns in the low-density inductor region L3 is 5 turns. Hence, regarding the L values in the three inductor regions L1 to L3, the L value in the first high-density inductor region L1 is the largest, the L value in the second high-density inductor region L2 is the second largest, and the L value in the low-density inductor region L3 is the smallest.

The magnitude relationship among the above-described L values is equivalent to the magnitude relationship among the L values of the three chip inductors 1 to 3 illustrated in FIG. 6. That is, if the second terminal electrode 19 of the inductor component 11 illustrated in FIG. 2 is connected to the high-frequency line 6 illustrated in FIG. 6, the first high-density inductor region L1 having the largest L value corresponds to the chip inductor 1, the second high-density inductor region L2 having the second largest L value corresponds to the chip inductor 2, and the low-density inductor region L3 having the smallest L value corresponds to the chip inductor 3.

As described above, as long as the three chip inductors 1 to 3 illustrated in FIG. 6 are unified into one chip and is provided with an inductor component 11 as illustrated in FIG. 2, the advantages can be attained as follows.

With the configuration in FIG. 6, the chip inductors 1 to 3 are electrically and mechanically joined to lands 4 and 5 on a substrate by a method of, for example, solder joining and mounted, and hence a gap is unavoidably generated between the chip inductors 1 to 3. In contrast, in the case of the inductor component 11 unified into one chip as illustrated in FIG. 2, the above-described gap can be eliminated. Since the gap is eliminated, adjacent ones of the inductor regions L1 to L3 are strongly coupled in the low-frequency region, the L value of the entire inductor component 11 is increased even though the total number of turns of the inductor regions L1 to L3 is equivalent to the total number of turns of the chip inductors 1 to 3 in FIG. 6. Since the entire L value increases, in the inductor component 11, the requested L value can be realized by a smaller number of turns than that of the configuration in FIG. 6. The distance between wound wires can be increased by that amount if required. Consequently, the capacitance can be decreased.

The above-described advantage can be attained similarly in the case of the inductor component 21 according to the embodiment illustrated in FIG. 1.

However, the inventor of this application has conceived that it is not practically useful to arrange the three inductor regions L1 to L3 in the inductor component 11 unified into one chip on the basis of the magnitude relationship among the L values of the three chip inductors 1 to 3 illustrated in FIG. 6 in, for example, a frequency region of several gigahertz. Since the external shape of the inductor component 11 is sufficiently small in terms of the wavelengths of the frequencies in use, the intervals between the three inductor regions L1 to L3 are sufficiently small in terms of the wavelengths regardless of the positions of the inductor regions L1 to L3 in the inductor component 11. Hence, the above-described deterioration in isolation rarely occurs. The arrangement of the inductor regions L1 to L3 has to be considered in a high-frequency region of 20 GHz or higher like frequencies of millimeter waves. With frequencies lower than frequencies of millimeter waves, if the plurality of inductor regions L1 to L3 are arrayed in the inductor component 11 unified into one chip, it is no longer required to arrange the region with a small L value, that is, the low-density inductor region L3 on the high frequency side.

Figure 3:
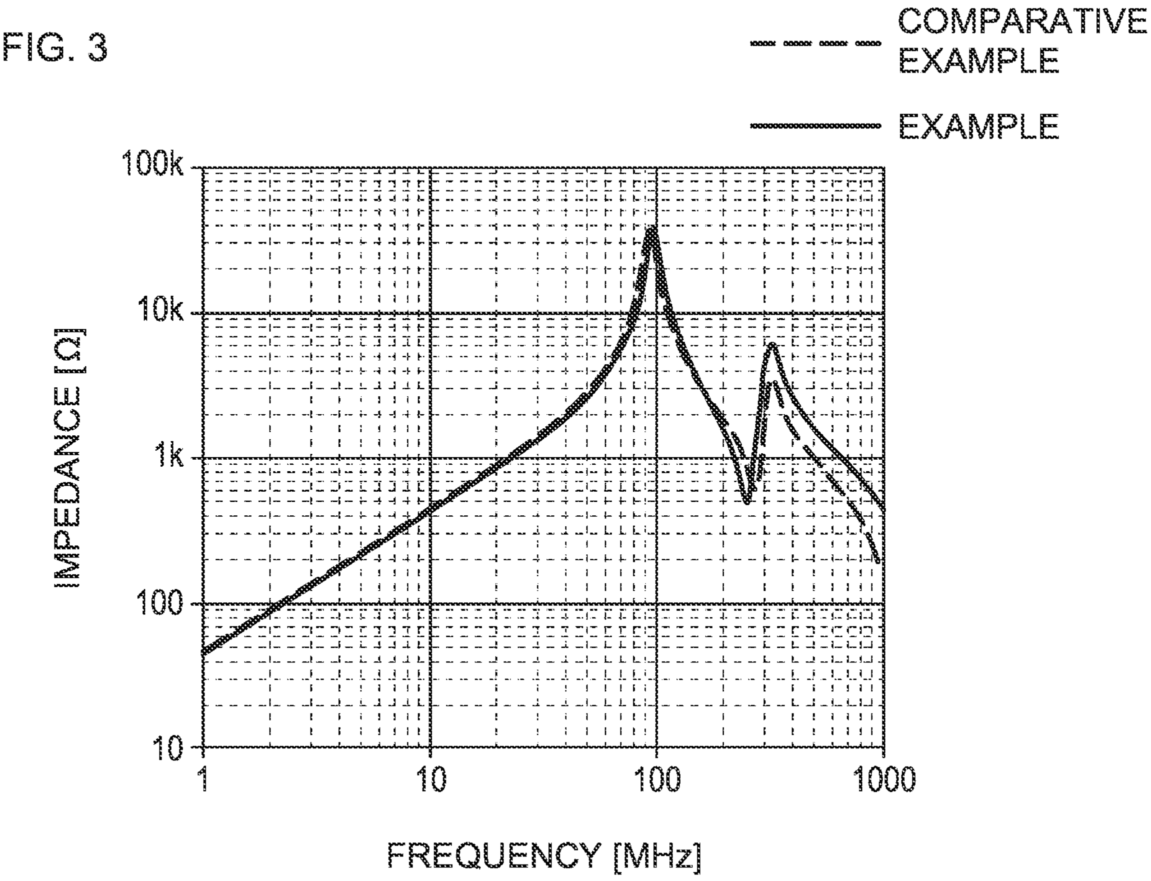
FIG. 3 illustrates a comparison in impedance-frequency characteristics between the inductor component illustrated in FIG. 1 and the inductor component illustrated in FIG. 2.

FIG. 3 illustrates impedance-frequency characteristics of the inductor component 21 according to the example illustrated in FIG. 1 by using a solid line, and impedance-frequency characteristics of the inductor component 11 according to the comparative example illustrated in FIG. 2.

The resonant frequency of an RLC parallel resonance circuit is determined by $1/\{2\pi(LC)^{1/2}\}$. In this embodiment, the equivalent L value of the low-density inductor region L3 with a small equivalent C value is increased by magnetic coupling between the adjacent high-density inductor regions L1 and L2. Accordingly, the resonant frequency of the low-density inductor region L3 becomes lower than the inductor component 11.

In FIG. 3, the second peak counted from the left of the impedance of the impedance-frequency characteristics of the inductor component 21 indicated by the solid line is caused by resonance of the inductor region L3 whose resonant frequency is decreased. The peak is shifted to the left as compared with the peak of the impedance of the impedance-frequency characteristics of the inductor component 11 indicated by the broken line in FIG. 3 (caused by resonance of the inductor region L2).

Further, in the inductor component 21 (solid line), the second peak counted from the left in FIG. 3 is caused by resonance in the inductor region L3 with an equivalent C value smaller than that of the inductor region L2. Hence, an impedance curve after the peak is at a position higher than the position of the inductor component 11 (broken line). This is because the impedance curve after the peak has capacitance characteristics of (Z=1/jwC).

As illustrated in FIG. 3, at a position around the second peak counted from the left, the inductor component 21 according to the example illustrated in FIG. 1 can attain higher impedance than that of the inductor component 11 according to the comparative example illustrated in FIG. 2, and high impedance can be ensured over a wide band.

Figure 4A:
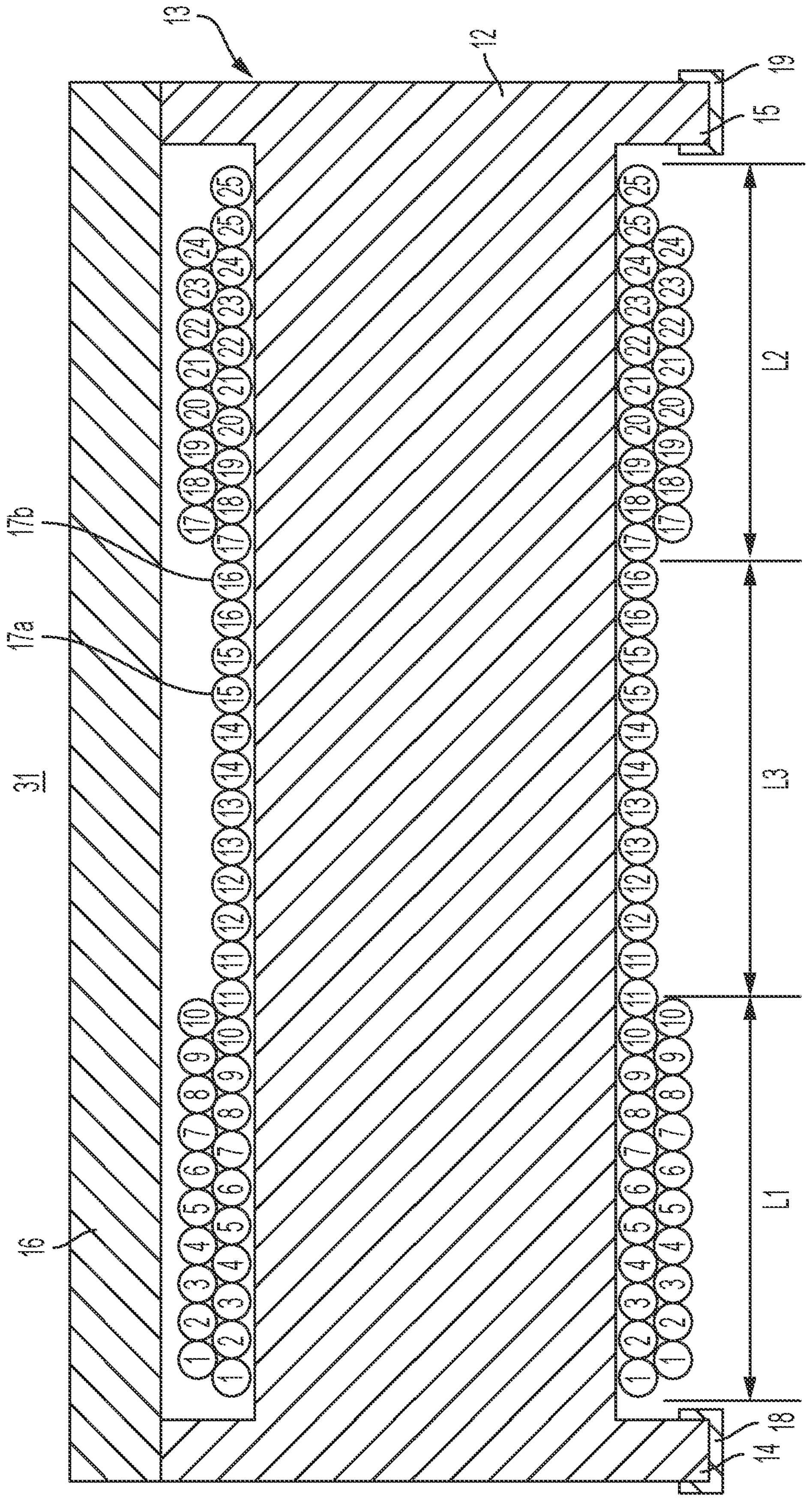
FIG. 4A is a cross-sectional view schematically illustrating an inductor component according to a second embodiment of the disclosure.
Figure 4B:
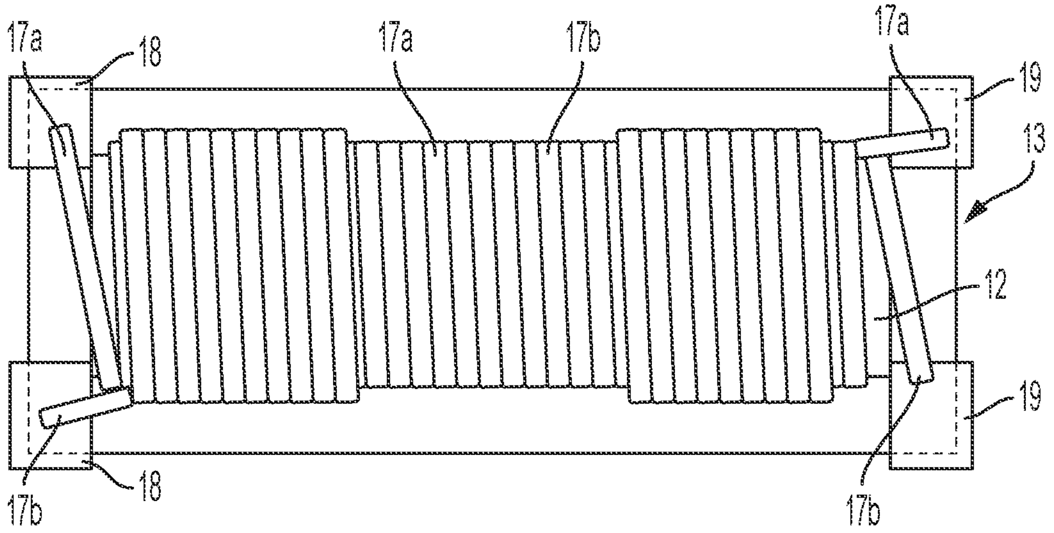
FIG. 4B is an example of a view of FIG. 4A taken in a direction facing the first and second terminal electrodes.
Figure 5:
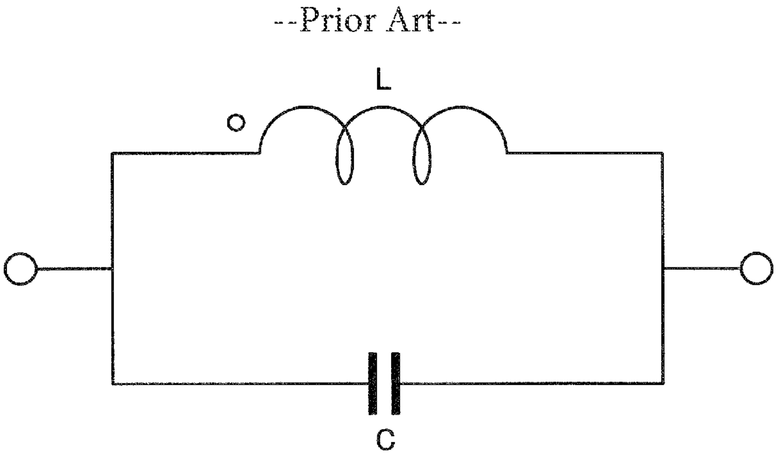
FIG. 5 is an equivalent circuit diagram of a wire-wound inductor component for describing the related art of the disclosure.

FIG. 4A is a cross-sectional view schematically illustrating an inductor component 31 according to a second embodiment of the disclosure, and FIG. 4B is an example of a view of FIG. 4A taken in a direction facing the first and second terminal electrodes 18 and 19. In FIGS. 4A and 4B, like reference signs are applied to like components corresponding to those in FIG. 1 or 2, and redundant description is omitted.

An inductor component 31 illustrated in FIGS. 4A and 4B includes two wires 17*a* and 17*b* connected between a pair of terminal electrodes 18 and 19. When the two wires 17*a* and 17*b* are connected between the pair of terminal electrodes 18 and 19, this can decrease the electrical resistance value of the inductor component 31 as compared with a case where only one of the wires 17*a* and 17*b* is connected.

In FIGS. 4A and 4B, the cross sections indicating the second wire 17*b* are meshed in order to clarify the discrimination between the first wire 17*a* and the second wire 17*b*.

In the inductor component 31 according to the second embodiment illustrated in FIGS. 4A and 4B, the wires 17*a* and 17*b* form three inductor regions L1 to L3 arrayed in the longitudinal direction of the core portion 12 and having mutually different winding densities of the wires 17*a* and 17*b*, and the low-density inductor region L3 is located between the first and second high-density inductor regions L1 and L2, similarly to the case of the inductor component 21 illustrated in FIG. 1. In other words, the first high-density inductor region L1, the low-density inductor region L3, and the second high-density inductor region L2 are arrayed in that order from the left in FIGS. 4A and 4B in the longitudinal direction of the core portion 12.

In this case, the wires 17*a* and 17*b* are wound by 20 turns by the length for 10 turns in the first high-density inductor region L1, and hence the winding density is 20/10=2. The wires 17*a* and 17*b* are wound by 18 turns by the length for 10 turns in the second high-density inductor region L2, and hence the winding density is 18/10=1.8. The wires 17*a* and 17*b* are wound by 6 turns by the length for 12 turns in the low-density inductor region L3, and hence the winding density is 6/12=0.5. In short, the winding density is the highest in the first high-density inductor region L1, the winding density is the second highest in the second high-density inductor region L2, and the winding density is the lowest in the low-density inductor region L3.

In the inductor component 31 according to the second embodiment, the first and second wires 17*a* and 17*b* are wound in a single layer while alternately arranged in the low-density inductor region L3; and one of the first and second wires 17*a* and 17*b*, for example, the first wire 17*a* is wound in a lower layer, and the other one of the first and second wires 17*a* and 17*b*, for example, the second wire 17*b* is wound in an upper layer, in the high-density inductor regions L1 and L2.

Regarding the number of turns of the wires 17*a* and 17*b* in each of the three inductor regions L1 to L3, the first and second wires 17*a* and 17*b* are electrically connected in parallel, and hence a pair of two wires behaves like a thick rectangular wire. It is reasonable to consider the number of turns as the number of turns of one of the wires. Describing the number of turns in this regard, the number of turns in the first high-density inductor region L1 is 10 turns, the number of turns in the low-density inductor region L3 is 6 turns, and the number of turns in the second high-density inductor region L2 is 9 turns. Hence, regarding the L values in the three inductor regions L1 to L3, the L value in the first high-density inductor region L1 is the largest, the L value in the second high-density inductor region L2 is the second largest, and the L value in the low-density inductor region L3 located between the first and second high-density inductor regions L1 and L2 is the smallest.

In the above-described second embodiment, the two wires 17*a* and 17*b* are connected between the pair of terminal electrodes 18 and 19; however, three or more wires may be connected if required.

The plate-shaped core 16 is provided in each of the inductor components 21 and 31 according to the first and second embodiments; the plate-shaped core 16 may be omitted.

Although the illustrated embodiments are exemplifications, the structures according to different embodiments may be partly replaced or combined. While some embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A coil component, comprising:

a core including a core portion extending in a longitudinal direction;

at least one wire helically wound around the core portion; and a pair of terminal electrodes electrically connected to respective end portions of the wire, wherein, when a winding density represents the number of turns of the wire per unit length in the longitudinal direction of the core portion, a plurality of inductor regions having mutually different winding densities of the wire are arrayed in the longitudinal direction of the core portion, and a low-density inductor region with the winding density being relatively low is located between first and second high-density inductor regions with the winding densities being relatively high, wherein in the first high-density inductor region, the at least one wire is wound in a first winding layer contacting the core portion in a direction beginning at a first end of the first high-density inductor region toward a second end of the first high-density inductor region such that the number of turns increases in sequential integer order from a lowest number at the first end of the first high-density inductor region to a highest number at the second end of the first high-density inductor region, and the at least one wire is wound in a second winding layer on top of the first winding layer in a direction beginning proximate to the first end of the first high-density inductor region toward the second end of the first high-density inductor region, wherein in the second high-density inductor region, the at least one wire is wound in a first winding layer contacting the core portion and in a second winding layer on top of the first winding layer, and wherein at least the first and second high-density inductor regions include a portion of the at least one wire turning back by greater than or equal to 1.5 turns from the first winding layer.

2. The coil component according to claim 1, wherein a length of the first high-density inductor region in the longitudinal direction of the core portion differs from a length of the second high-density inductor region in the longitudinal direction of the core portion.

3. The coil component according to claim 1, wherein a length of the first high-density inductor region in the longitudinal direction of the core portion is the same as a length of the second high-density inductor region in the longitudinal direction of the core portion.

4. The coil component according to claim 1, wherein the winding density in the first high-density inductor region differs from the winding density in the second high-density inductor region.

5. The coil component according to claim 1, wherein the winding density in the first high-density inductor region is the same as the winding density in the second high-density inductor region.

6. The coil component according to claim 1, wherein the low-density inductor region located between the first and second high-density inductor regions is located at a center portion in the longitudinal direction of the core portion.

7. The coil component according to claim 1, wherein the wire is wound in a single layer in the low-density inductor region, and is wound in multiple layers in the high-density inductor regions.

8. The coil component according to claim 7, wherein the wire includes a single wire connected between the pair of terminal electrodes, the single wire is wound in the single layer in the low-density inductor region, and the single wire is wound in the multiple layers in the high-density inductor regions.

9. The coil component according to claim 1, wherein the core is a drum-shaped core made of a magnetic material, and includes a pair of flange portions provided at respective end portions of the core portion, and wherein the inductor component further comprises a plate-shaped core made of a magnetic material and bridging the pair of flange portions.

10. The coil component according to claim 1, wherein in the second high-density inductor region, the at least one wire is wound in the first winding layer contacting the core portion in a direction beginning at a first end of the second high-density inductor region toward a second end of the second high-density inductor region, and the at least one wire is wound in the second winding layer on top of the first winding layer in a direction beginning proximate to the first end of the second high-density inductor region toward the second end of the second high-density inductor region.

11. The coil component according to claim 9, wherein the low-density inductor region is adjacent to the second end of the first high-density inductor region.

12. The coil component according to claim 10, wherein the low-density inductor region is between the second end of the first high-density inductor region and the first end of the second high-density inductor region.

13. The coil component according to claim 10, wherein a first one of the terminal electrodes is proximate to the first end of the first high-density inductor region and a second one of the terminal electrodes is proximate to the second end of the second high-density inductor region.

14. The coil component according to claim 1, wherein in the second winding layer in the first high-density inductor region, the number of turns increases in sequential integer order beginning proximate to the first end of the first high-density inductor region with a number one integer greater than the highest number in the first winding layer at the second end of the first high-density inductor region and ending proximate to the second end of the first high-density inductor region.

15. The coil component according to claim 1, wherein in the second high-density inductor region, there is no turn in the second layer that contacts the last two turns in the first layer.

16. A coil component, comprising:

a core including a core portion extending in a longitudinal direction;

at least one wire helically wound around the core portion; and a pair of terminal electrodes electrically connected to respective end portions of the wire, wherein, when a winding density represents the number of turns of the wire per unit length in the longitudinal direction of the core portion, a plurality of inductor regions having mutually different winding densities of the wire are arrayed in the longitudinal direction of the core portion, and a low-density inductor region with the winding density being relatively low is located between first and second high-density inductor regions with the winding densities being relatively high, wherein in the first high-density inductor region, the at least one wire is wound in a first winding layer contacting the core portion in a direction beginning at a first end of the first high-density inductor region toward a second end of the first high-density inductor region such that the number of turns increases in sequential integer order from a lowest number at the first end of the first high-density inductor region to a highest number at the second end of the first high-density inductor region, and the at least one wire is wound in a second winding layer on top of the first winding layer in a direction beginning proximate to the first end of the first high-density inductor region toward the second end of the first high-density inductor region, wherein in the second high-density inductor region, the at least one wire is wound in a first winding layer contacting the core portion and in a second winding layer on top of the first winding layer, and wherein at least the first high-density inductor region includes a portion of the at least one wire turning back by more than 1.5 turns from the first winding layer.

17. The coil component according to claim 16, wherein in the second high-density inductor region, there is no turn in the second layer that contacts the last two turns in the first layer.

* * * * *